United States Patent [19]

Qwarfort

[11] 4,169,750

[45] Oct. 2, 1979

[54] LABELLING MACHINE

[76] Inventor: Rune T. Qwarfort, Box 1047, S-26090 Bastad, Sweden

[21] Appl. No.: 925,155

[22] Filed: Jul. 17, 1978

[30] Foreign Application Priority Data

Jul. 19, 1977 [SE] Sweden ............................ 7708352

[51] Int. Cl.$^2$ ........................ B44C 1/00; B32B 35/00

[52] U.S. Cl. ................................ 156/541; 156/584

[58] Field of Search ........................ 156/540.2, 584

[56] References Cited

U.S. PATENT DOCUMENTS

| | | | |
|---|---|---|---|
| 3,793,114 | 2/1974 | Thomas | 156/542 |
| 3,992,244 | 11/1976 | Craig | 156/541 |
| 4,017,350 | 4/1977 | Thomas | 156/541 |
| 4,080,239 | 3/1978 | Real | 156/542 |

*Primary Examiner*—Douglas J. Drummond

*Attorney, Agent, or Firm*—Fleit & Jacobson

[57] ABSTRACT

The present invention relates to a device for automatical placing of labels or the like on a number of packages or the like, suitably of smaller size, and suitably of the same form and size.

The device according to the invention is mainly consisting of a fixed rack carrying a pivoting and displaceable arm, controlled by electrically, pneumatically, or hydraulically operated control cylinders. To the outer end of the arm a flexible label carrier strip is brought, which is suitably taken from a storage roll containing a large length of the strip fitted with labels. From the outer end of the arm the labels are then successively applied on the packages or the articles.

3 Claims, 5 Drawing Figures

L
S
K
C1
A
C2
g1
g2
F
E
R
B
D
H

LABELLING MACHINE

The character of the device according to the invention is described in detail in the patent claims.

The design of the device according to the invention is simple and robust and thus it will be cheap to produce and simple to adjust. Further, it is very space-saving and noiseless.

In order to make the invention and its advantages clearer an application example of the labelling machine according to the invention is shown on the enclosed drawings, but it is understood that the invention is not limited to this application form but that different modifications can be met with within the limit of the invention.

Figure 1:
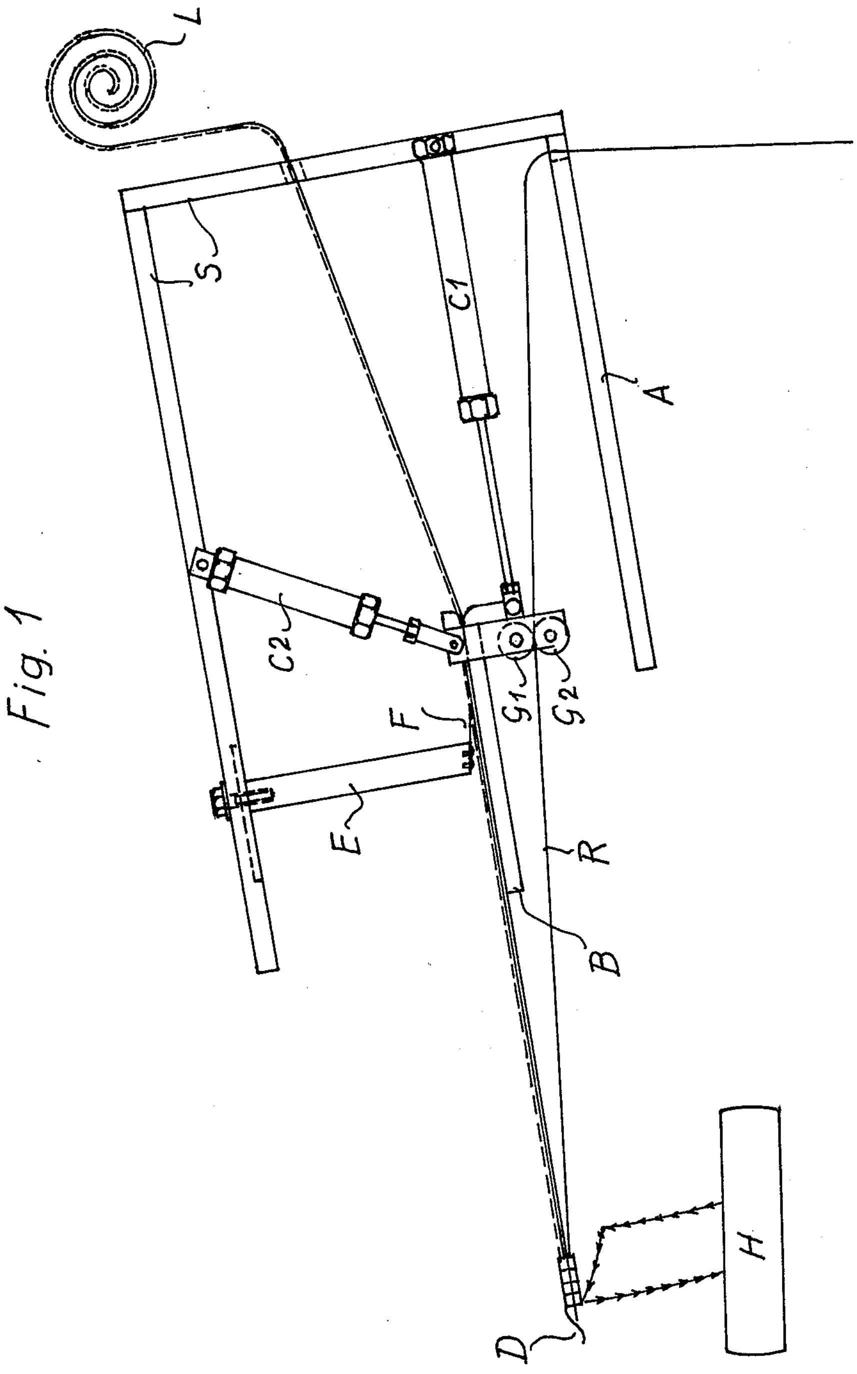
Figure 2:
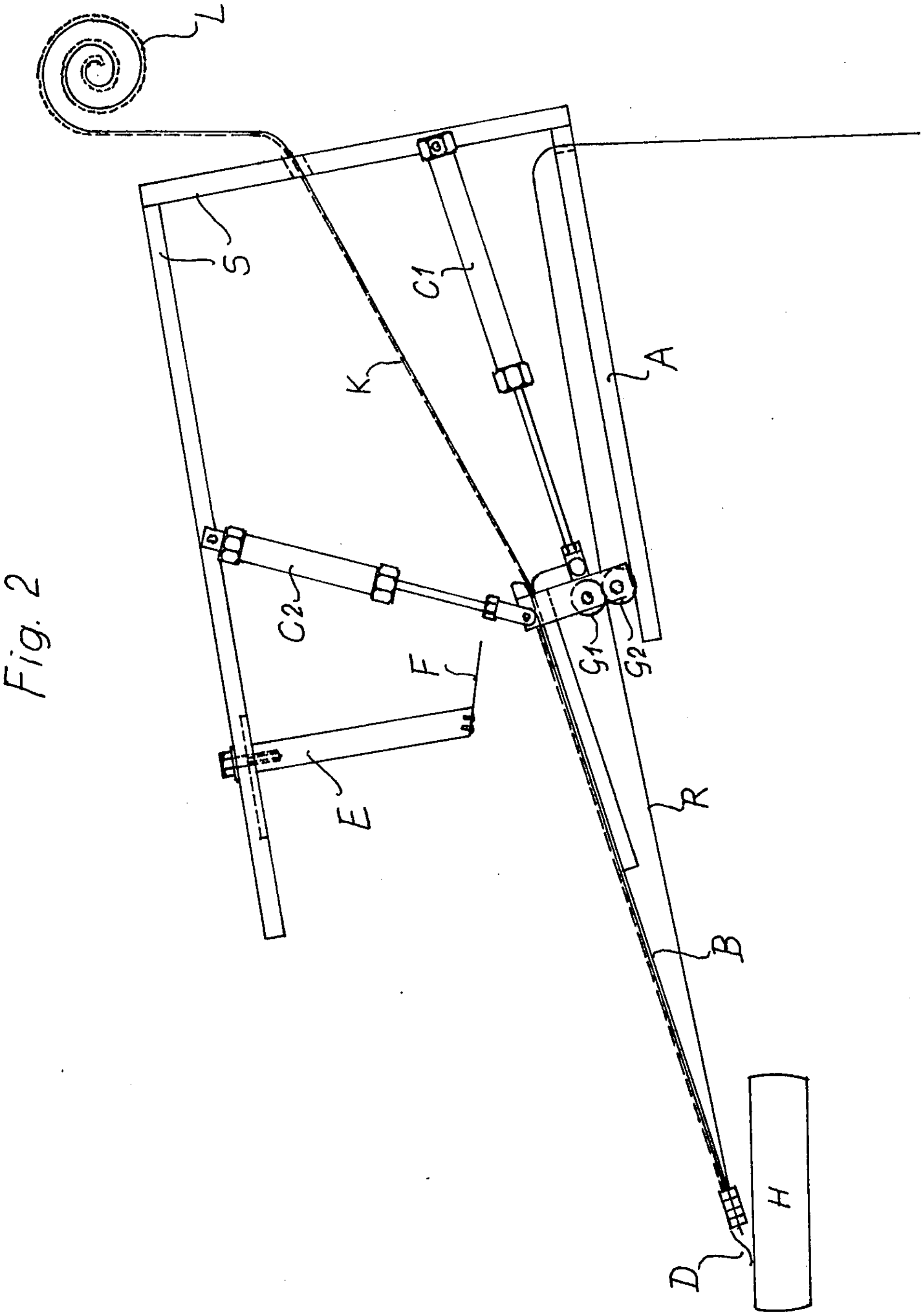
Figure 3:
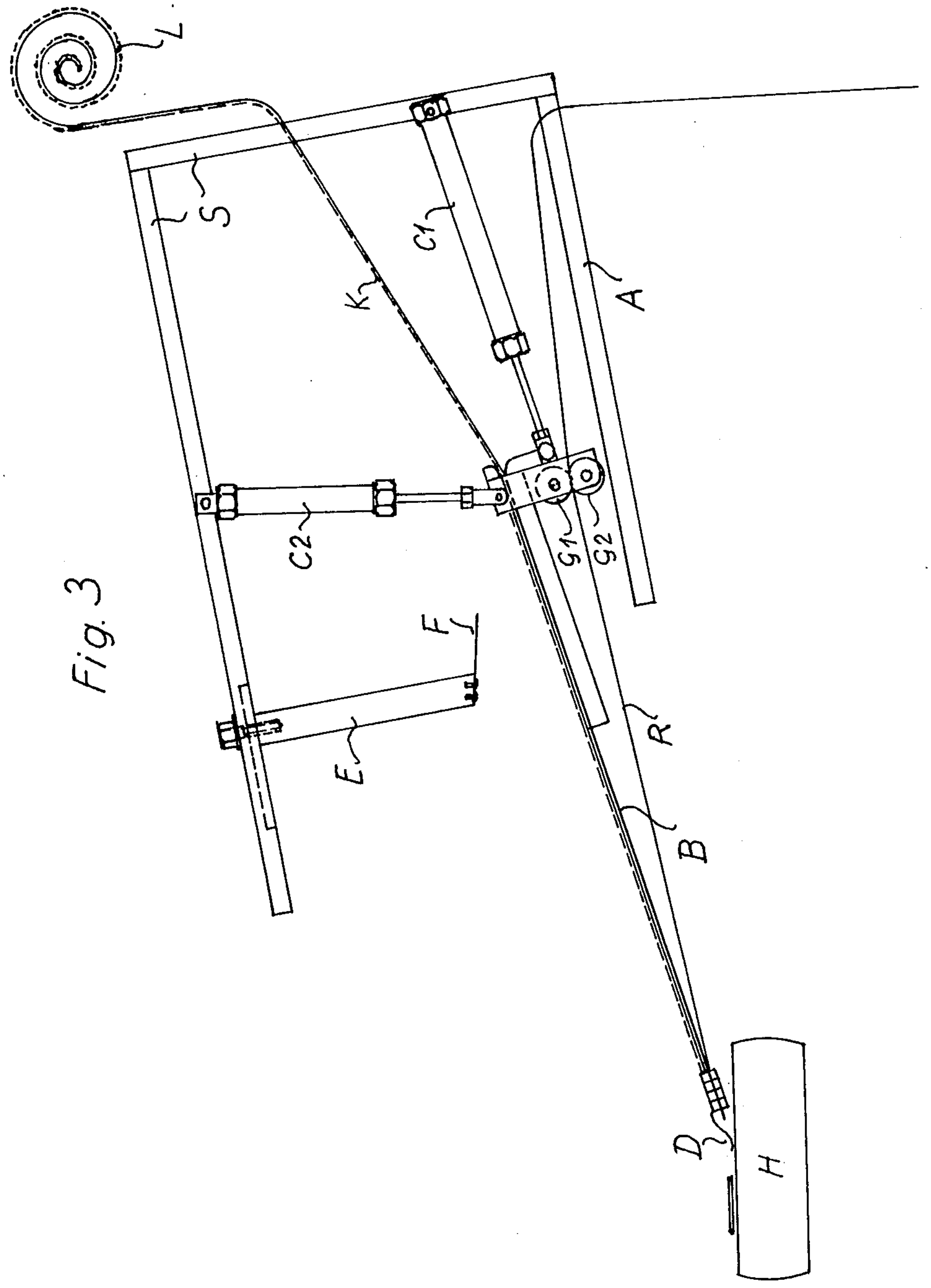
Figure 4:
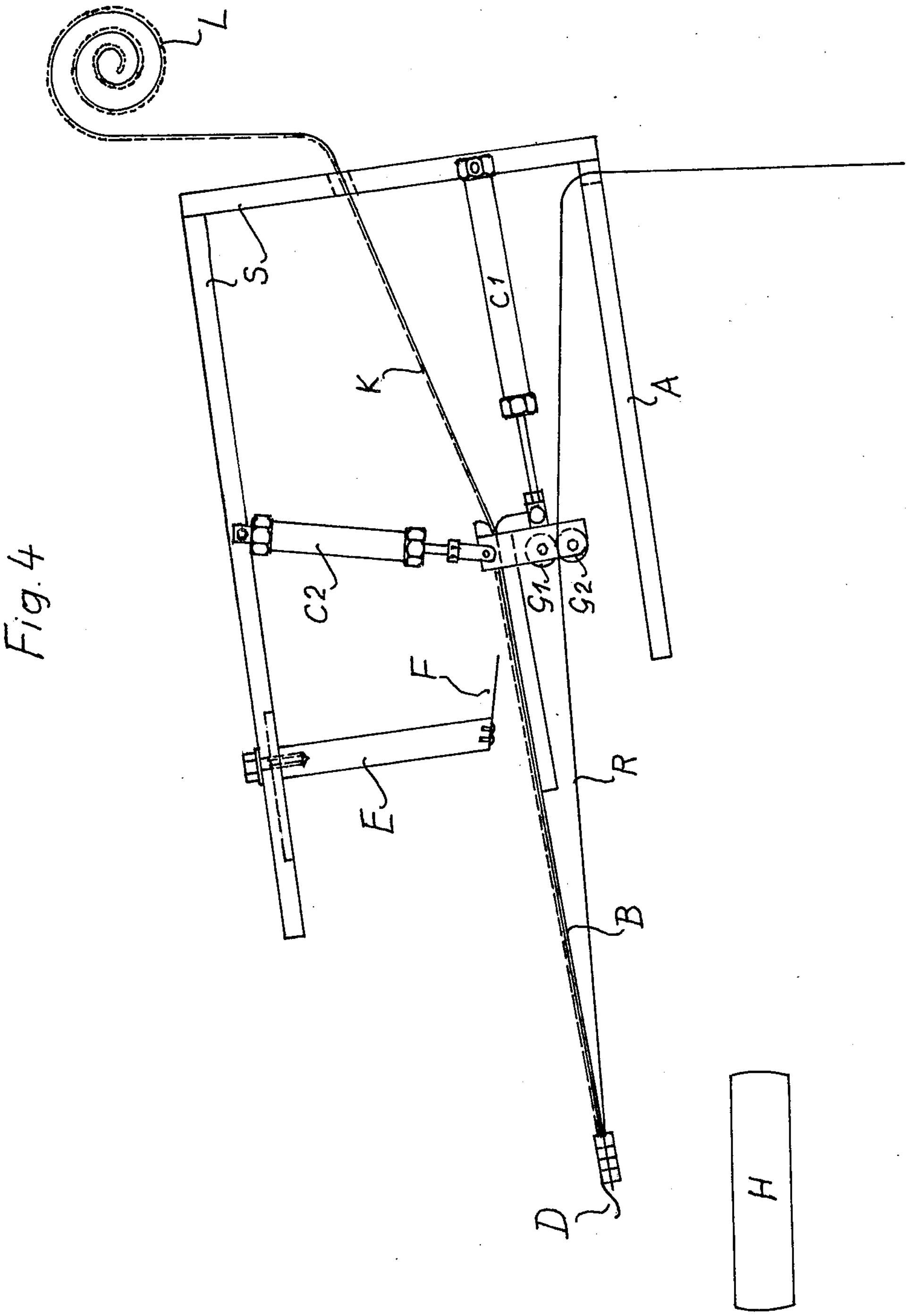
Figure 5:
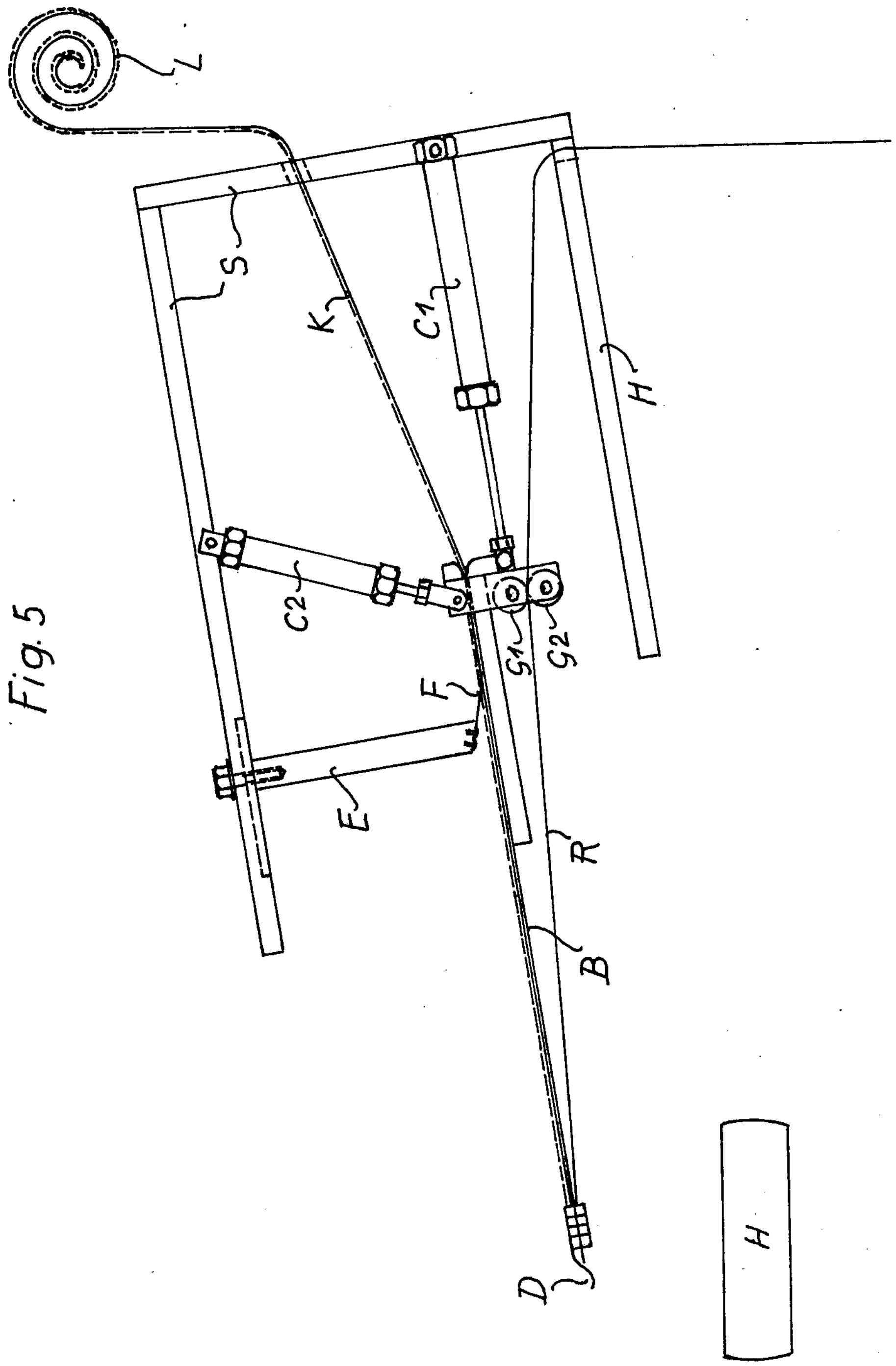

On the drawings FIG. 1 shows the labelling machine in initial position,

FIG. 2 the position when the arm has descended towards the article to be labeled, FIG. 3 the position of the arm after the pulling out, FIG. 4 the position of the arm when it has retired from the article, and FIG. 5 the position immediately before reaching the initial position in FIG. 1.

The figures of the drawings contain the following designations:

A base plate of the rack,
B labelling arm,
C1 one of the control cylinders,
C2 the other control cylinder,
D label applicator,
E adjustable arm for adjustment of the distance, and attachment for re-feeding spade,
F re-feeding spade (flat spring),
G1 one of the rolls (the upper one),
G2 the other roll (the lower one) (covered with rubber),
H article to be labeled,
L storage roll with carrying strip for labels,
K label on carrying strip,
R carrying strip,
S rack.

In the main the machine showed in the drawing works in the following way:

As mentioned above, FIG. 1 shows the machine in the initial position. The labelling arm is in its upper front position and the article to be labeled is lying underneath.

The cylinder C2 is started, during which the labelling arm B is pushed down until the feeding roll G2 is pressed against the base plate A. The label applicator D is now resting on the article H, see FIG. 2. The front part of the labelling arm is elastic and therefore a certain tolerance of the height of the article can be allowed.

The roll G2 has got a certain mobility in relation to the roll G1. The pressure downwards is thus totally taken up between the rolls G2 and G1 and the carrying strip between them, which can be consisting of paper.

The cylinder C1 is now starting: The labelling arm B together with the rolls G2 and G1 is then pulled inwards or backwards. The roll G2 rolls on the base plate A and the paper strip is driven between the rolls in the same pace as the labelling arm moves. The label that is applied on the article and is pressed by the applicator D will thus be lying still in relation to the article, see FIG. 3.

The travel of the cylinder C1 shall be adjusted in that way that the feeding will be somewhat longer than the distance between two of the labels on the strip.

The cylinder C2 is reversed: The labelling arm is lifted up from the article H, see FIG. 4.

The cylinder C1 is reversed: The labelling arm B is pushed forwards towards the initial position.

The roll G2 is now free from the base plate A but the roll G1 is slightly braked and therefore the strip is fed from the storage roll L in the first place.

The labelling arm B is describing a "swinging" motion with the highest point at the initial position at the very front. Immediately before this position the labelling arm has got so high up that the re-feeding spade (flat spring) F has been pressed against the label strip, see FIG. 5. The label strip slides under the spade F until its edge touches the front of a label. The strip is now stopped by the spade F, and during the last part of the motion the strip is pushed backwards exactly as much as the rolls have been feeding too far at the pulling out. Thus, in the initial position, see FIG. 1, the first label is always placed in the correct position.

I claim:

1. Labelling machine, by means of which labels can be successively applied on for instance an article, containing a storage roll (L), built in in a rack (S) or the like, for a flexible carrying strip (R) with labels (K) applied on one side, which strip is arranged to be put to the outer end of a movable labelling arm (B) fitted with an applicator (D) or the like for the purpose of loosening labels at this end and applying them on the surface of the article (H), and that the carrier (R) from there is arranged to pass between two driving rolls (G1,G2) for the carrying strip, which are connected with the arm (B), characterized by the movable arm being displaceable and pivoting by means of a first and a second control cylinder (C1,C2) fixed on the rack in that way that the arm (B) can move from the first position, in which a device (E,F) is arranged to adjust the initial position of the labels before the application of a label, to the second position, in which the outer end of the arm (B) presses slightly on the surface of the article (H), which is stationary in relation to the rack, at the same time as one of the driving rolls (G2) is pressed against a part (A) of the rack (S) or a part connected with this and by means of the effect of the first cylinder (C1) is put in rotation and then is feeding the carrier (R) at the same time as the arm is brought backwards by the cylinder (C1) a prescribed length, suitably somewhat longer than the pitch distance between two labels on the strip (R), and in doing so applies a label on the article (H), after which the other cylinder (C2) is arranged to move the arm (B) back to the first position, when also the first cylinder (C1) has been brought back to its initial position, at which the strip (R), during the bringing back of the arm (B) to the first position, is arranged to be kept at the arm (R) in the position adjusted after application of the label.

2. Machine according to claim 1, characterized by the driving rolls (G1,G2) bearing on each other with a slight pressure even in a position when one of them (G2) is not bearing on the rack part (A) and the other driving roll (G1) being slightly braked, which causes that the strip (R), when the first control cylinder (C1) is reversing its motion, in the first place will be kept between the driving rolls (G1,G2) and be fed out from the storage roll (L).

3. Machine according to claim 1 or 2, characterized by the flexible carrying strip (R) with the labels (K)

applied on it being arranged to be adjusted into the initial position by means of a flat spring (F) or the like, fixed on a suitably deplaceable and adjustable arm (E), which spring is bearing on the carrying strip (R) on the side where the labels (K) are applied, when the labelling arm (B) is brought back to the initial position by the cylinders (C1,C2), and, when touching the front edge of a label, brings the carrying strip back a little, so that, when the motion of the cylinders is completed, the outermost label gets the correct initial position at the outer end of the labelling arm (B).

* * * * *